United States Patent
Yamamoto et al.

(10) Patent No.: US 9,146,161 B2
(45) Date of Patent: Sep. 29, 2015

(54) OPTICAL WAVELENGTH METER

(71) Applicants: YOKOGAWA ELECTRIC CORPORATION, Musashino-shi, Tokyo (JP); YOKOGAWA METERS & INSTRUMENTS CORPORATION, Tachikawa-shi, Tokyo (JP)

(72) Inventors: Toshikazu Yamamoto, Tachikawa (JP); Manabu Kojima, Tachikawa (JP)

(73) Assignees: YOKOGAWA ELECTRIC CORPORATION, Tokyo (JP); YOKOGAWA METERS & INSTRUMENTS CORPORATION, Tokyo (JP)

( * ) Notice: Subject to any disclaimer, the term of this patent is extended or adjusted under 35 U.S.C. 154(b) by 42 days.

(21) Appl. No.: 14/069,424

(22) Filed: Nov. 1, 2013

(65) Prior Publication Data

US 2014/0125984 A1  May 8, 2014

(30) Foreign Application Priority Data

Nov. 5, 2012 (JP) ................................. 2012-243583

(51) Int. Cl.
- G01B 9/02 (2006.01)
- G01J 3/45 (2006.01)
- G01J 9/02 (2006.01)

(52) U.S. Cl.
CPC ...................... *G01J 9/0246* (2013.01)

(58) Field of Classification Search
CPC .......................... G01J 9/046; G01J 2009/0284
See application file for complete search history.

(56) References Cited

U.S. PATENT DOCUMENTS

| 4,319,843 | A  | * | 3/1982 | Gornall ......................... 356/455 |
| 4,817,100 | A  |   | 3/1989 | Cameron et al. |
| 4,955,026 | A  |   | 9/1990 | Hill et al. |
| 5,110,211 | A  | * | 5/1992 | Niki et al. ...................... 356/451 |
| 6,462,823 | B1 | * | 10/2002 | Braun et al. .................... 356/452 |
| 6,462,827 | B1 | * | 10/2002 | Frankel ......................... 356/491 |
| 6,842,252 | B1 | * | 1/2005 | Gornall et al. ................ 356/455 |
| 2006/0221344 | A1 | * | 10/2006 | Masuda et al. ................ 356/451 |

FOREIGN PATENT DOCUMENTS

| JP | 63502391 A | 9/1988 |
| JP | 514867 U | 2/1993 |
| WO | 8704572 A1 | 7/1987 |

OTHER PUBLICATIONS

Feng-Lei Hong, Atsushi Onae, "633 nm Unstabilized He-Ne lasers as a wavelength standard—Recommendation of the International Committee for Weights and Measures (CIPM)," AIST Bulletin of Metrology, Aug. 2010, vol. 8, No. 1, p. 11 to 13, with Partial Translation.

* cited by examiner

*Primary Examiner* — Michael A Lyons
(74) *Attorney, Agent, or Firm* — Lowe Hauptman & Ham, LLP

(57) ABSTRACT

An optical wavelength meter includes: an interferometer; a reference optical source unit with a laser configured to oscillate in a multi-longitudinal mode; and a signal processor configured to calculate a wavelength of a input beam with reference to interference fringe information of reference beam and interference fringe information of the input beam obtained from the interferometer.

8 Claims, 8 Drawing Sheets

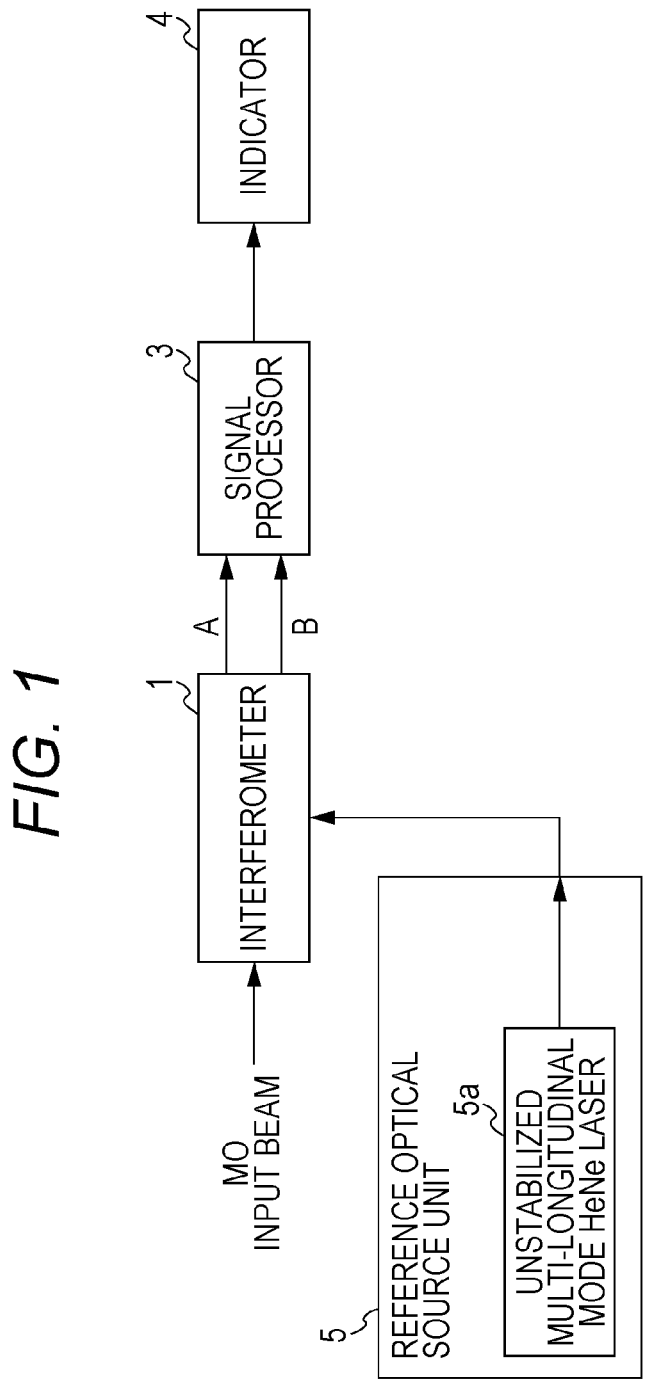

OPTICAL WAVELENGTH METER

CROSS-REFERENCE TO RELATED APPLICATION

This application claims priority from Japanese Patent Application No. 2012-243583 filed with the Japan Patent Office on Nov. 5, 2012, the entire content of which is hereby incorporated by reference.

BACKGROUND

1. Technical Field

The present disclosure relates to an optical wavelength meter.

2. Related Art

Non-Patent Document 1 sets forth uncertainty in wavelength (frequency) of an unstabilized He—Ne laser.

Non-Patent Document 1: Feng-Lei HONG, Atsushi ONAE, "633 nm Unstabilized He—Ne lasers as a wavelength standard—Recommendation of the International Committee for Weights and Measures (CIPM)," AIST Bulletin of Metrology, August 2010, Vol. 8, No. 1, p. 11 to 13

SUMMARY

An optical wavelength meter includes: an interferometer; a reference optical source unit with a laser configured to oscillate in a multi-longitudinal mode; and a signal processor configured to calculate a wavelength of a input beam with reference to interference fringe information of reference beam and interference fringe information of the input beam obtained from the interferometer.

BRIEF DESCRIPTION OF DRAWINGS

FIG. 1 is a block diagram illustrating the configuration of an optical wavelength meter according to an embodiment of the present disclosure;

DETAILED DESCRIPTION

Figure 2A:
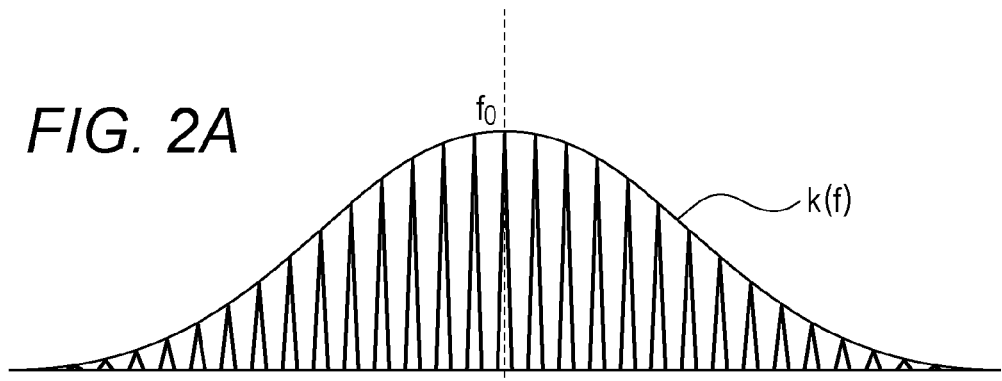
FIGS. 2A to 2C are explanatory diagrams illustrating magnitudes of electric fields of a multi-longitudinal mode He—Ne laser

In the following detailed description, for purpose of explanation, numerous specific details are set forth in order to provide a thorough understanding of the disclosed embodiments. It will be apparent, however, that one or more embodiments may be practiced without these specific details. In other instances, well-known structures and devices are schematically shown in order to simplify the drawing.

An optical wavelength meter according to an embodiment of the disclosure includes: an interferometer; a reference optical source unit with a laser configured to oscillate in a multi-longitudinal mode; and a signal processor configured to calculate a wavelength of a input beam with reference to interference fringe information of reference beam and interference fringe information of the input beam obtained from the interferometer.

In the optical wavelength meter, the interferometer may be a Michelson interferometer.

In the optical wavelength meter, the signal processor may calculate the wavelength of the input beam by counting the number of interference fringes with reference to the interference fringe information of the reference beam and the interference fringe information of the input beam obtained from the interferometer.

In the optical wavelength meter, the signal processor may calculate the wavelength of the input beam by Fourier transform with reference to the interference fringe information of the reference beam and the interference fringe information of the input beam obtained from the interferometer.

In the optical wavelength meter, a resonator mode spacing (free spectrum range) of the laser may be 500 MHz or less.

The optical wavelength meter allows the reference light source unit to be simply configured while maintaining the stability of wavelength measurement.

First Embodiment

Figure 9:
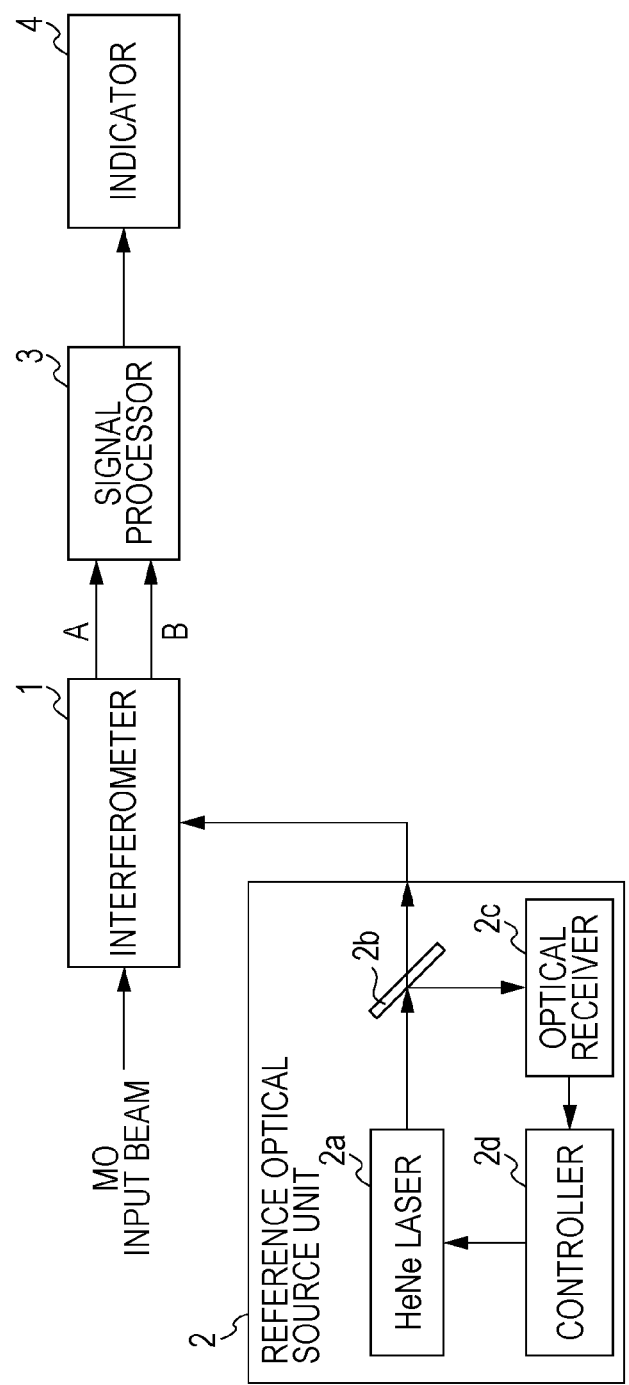
FIG. 9 is a schematic block diagram illustrating an exemplary configuration of an optical wavelength meter according to an embodiment of the present disclosure.

Hereinafter, an embodiment of the present disclosure will be described below with reference to the drawings. FIG. 9 is a schematic block diagram illustrating an exemplary configuration of an optical wavelength meter according to the embodiment. The optical wavelength meter measures and indicates the wavelength or frequency of input measured beam MO. The optical wavelength meter includes four components, that is, an interferometer 1, a reference optical source unit 2, a signal processor 3, and an indicator 4.

Figure 10:
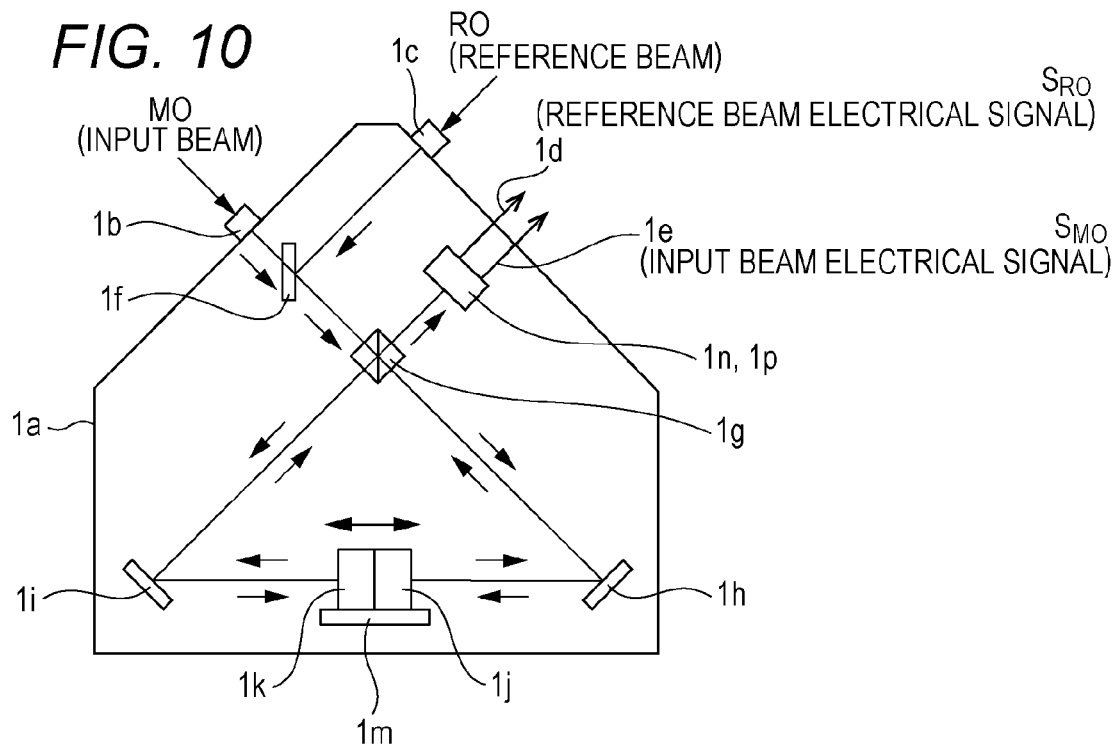
FIG. 10 is diagram illustrating an explanatory configuration of an interferometer.

FIG. 10 is a diagram illustrating an exemplary configuration of the interferometer 1. The interferometer 1 is a Michelson interferometer. The interferometer 1 is incorporated into a case 1a. An input terminal 1b for the input beam MO and an input terminal 1c for a reference beam RO are provided on an outer peripheral side surface of the case 1a. In addition, an output terminal 1d for reference beam electrical signal $S_{RO}$ and an output terminal 1e for input beam electrical signal $S_{MO}$ are disposed on the outer peripheral side surface of the case 1a.

In this embodiment, a single-longitudinal-mode optical source known in the art is used as a reference optical source unit for outputting the reference light RO. Specifically, for example, such an optical source is a He—Ne laser. The reference beam RO is reflected by a first mirror 1f and then enters a beam splitter 1g.

Meanwhile, the input beam MO passes through the first mirror 1f and then enters the beam splitter 1g. After passing through the first mirror 1f, the input beam MO passes an optical path different from the optical path for the reference beam RO in the vertical direction in the drawing.

The reference beam RO and the input beam MO, which have entered the beam splitter 1g, are each split into a transmitted beam and a reflected beam. The transmitted beam and the reflected beam are approximately orthogonal to each other.

The transmitted beam is reflected by a second mirror 1h toward a third mirror 1i. The reflected beam is reflected by the third mirror 1i toward the second mirror 1h. The beam reflected by the second mirror 1h is totally reflected by a movable mirror 1j formed by one corner cube. The beam reflected by the third mirror 1i is totally reflected by a movable mirror 1k formed by the other corner cube.

In this arrangement, a linear guide 1m is provided on an optical axis between the second mirror 1h and the third mirror 1i. The movable mirrors 1j and 1k are assembled into the linear guide 1m so as to be movable along the optical axis.

Then, the beam having been totally reflected by the one movable mirror 1j is reflected by the second mirror 1h and enters again the beam splitter 1g. The beam having been totally reflected by the other movable mirror 1k is reflected by the third mirror 1i and enters again into the beam splitter 1g.

Then, the beam splitter 1g multiplexes the transmitted beam and the reflected beam of the reference beam RO. The beam splitter 1g also multiplexes the transmitted beam and the reflected beam of the input beam MO.

At that time, on the linear guide 1m disposed on the optical axis, the pair of movable mirrors 1j and 1k formed by the corner cubes is moved along the optical axis. This makes a difference between an optical path length of the reflected light from the movable mirror 1j and an optical path length of the reflected light from the movable mirror 1k. The difference causes a change in intensity of interference fringes.

A light intensity signal of the interference fringes is converted into a reference beam electrical signal $S_{RO}$ by a reference beam receiver 1n provided at the stage vertically lower with respect to the surface of FIG. 10. The reference beam electrical signal $S_{RO}$ is output to the outside through the output terminal 1d. The light intensity signal of interference fringes is converted into an input beam electrical signal $S_{MO}$ by an input beam receiver 1p provided at the upper stage. The input beam electrical signal $S_{MO}$ is output to the outside through the output terminal 1e. The reference beam electrical signals $S_{RO}$ and the input beam electrical signal $S_{MO}$ are input into the signal processor 3.

At the signal processor 3 illustrated in FIG. 9, the wavelength of the input beam is calculated with reference to the input beam electrical signal $S_{MO}$ and the reference beam electrical signals $S_{RO}$ obtained from the interferometer 1. Specifically, the signal processor 3 calculates the wavelength of the input beam with reference to interference fringe information ($S_{RO}$) of the reference beam and interference fringe information ($S_{MO}$) of the input beam obtained from the interferometer 1.

When the movable mirrors 1j and 1k provided at the interferometer 1 change in position, the difference in optical path length (optical path length difference) between an optical beam reflected by the movable mirror 1j and an optical beam reflected by the movable mirror 1k varies from 0 to Δd. During the change, the interference fringes of the reference beam and the interference fringes of the measured signal beam are observed.

Figure 11:
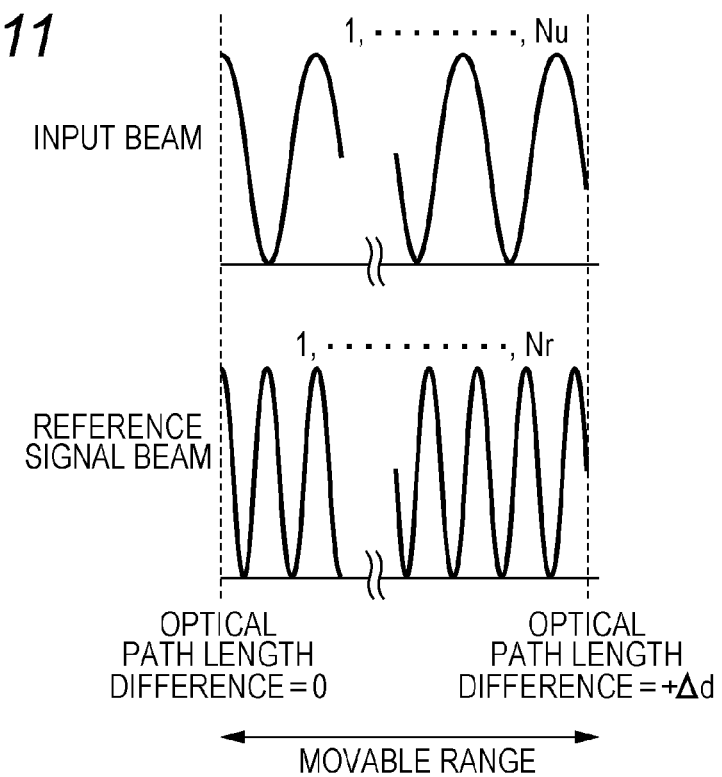
FIG. 11 is a graphical representation of the number of interference fringes on the optical wavelength meter illustrated in FIG. 9.

Here, the signal processor 3 has observed (counted) Nr interference fringes of the reference beam and Nu interference fringes of the input beam, as illustrated in FIG. 11. In this case, if the reference beam wavelength is designated as $\lambda_r$, the input beam wavelength as $\lambda_U$, the index of refraction for air at the reference beam wavelength as $n_r$, and the index of refraction for air at the input beam wavelength as $n_U$, the following relational expressions (1) and (2) hold:

$$nu \cdot \Delta d = \lambda u \cdot Nu \qquad (1)$$

$$nr \cdot \Delta d = \lambda r \cdot Nr \qquad (2)$$

From the foregoing equations (1) and (2), the signal processor 3 can determine the input beam wavelength $\lambda_U$ by the following equation:

$$\lambda u = (Nr/Nu) \cdot (nu/nr) \cdot \lambda r \qquad (3)$$

The indicator 4 indicates the result of the calculation.

The reference beam wavelength $\lambda r$ in the equation (3) is calculated by substituting a preset fixed value. However, if the actual wavelength of the reference beam shifts from the set value, the spacing between the interference fringes changes, and the number Nr of the interference fringes also changes. As a result, the measurement result of the input beam wavelength $\lambda_U$ also shifts from the set value.

The oscillation wavelength (frequency) of a laser is determined by a gain curve and a resonator mode. In the case of a He—Ne laser, the gain curve has generally a full width at half maximum (hereinafter, referred to as FWHM) of about 1.5 GHz mainly due to Doppler effect produced by motion of Ne molecules.

Here, the speed of light is designated as c and the resonator length of the laser as L, the possible frequency of the resonator, that is, the resonator mode frequency f(N) is expressed as:

$$f(N) = N \cdot c/(2L) \qquad (4)$$

where N denotes an integer.

Thus, when the laser resonator length varies with temperatures, the resonator frequency of the laser changes according to the resonator mode. Accordingly, the actual wavelength of the reference beam also changes. It is known that uncertainty in wavelength (frequency) of an unstabilized He—Ne laser with a resonator not controlled is about $1.5 \times 10^{-6}$ (for example, refer to Non-Patent Document 1).

Therefore, when an unstabilized He—Ne laser is used as reference beam in a wavelength meter, it is difficult to reduce uncertainty in measured values of wavelength of the input beam to less than $1.5 \times 10^{-6}$.

Thus, to improve the stability of wavelength measurement by the wavelength meter, the reference optical source unit 2 illustrated in FIG. 9 retrieves a part of optical output from a He—Ne laser 2a by a beam sampler 2b. The retrieved part of optical output is converted by an optical receiver 2c into an electrical signal and fed back to the controller 2d. The controller 2d controls the resonator length of a laser tube of the He—Ne laser 2a. This allows the controller 2d to output laser light in a single longitudinal mode at a stable frequency (wavelength).

In this manner, the controller 2d stabilizes the positions of the interference fringes, that is, the number Nr of the interference fringes in the reference beam in the equation (3). This improves uncertainty in measurement.

The method for stabilizing the wavelength (frequency) of the He—Ne laser may include various methods as described below, for example.

a) Method by which the resonator length of the laser is controlled in a uniform state by monitoring laser output level b) Method by which, taking advantage of the matter that adjacent longitudinal modes of the He—Ne laser are orthogonal to each other, the two modes are separated by a polarized beam splitter, for example, and the intensity ratio is monitored, and then the resonator length is controlled such that the intensity ratio becomes uniform to retrieve one mode c) Method by which Zeeman splitting is used to control the resonator length d) Method by which the absorption line of molecules of iodine or the like to control the resonator length These methods can be used to reduce uncertainty resulting from the reference beam. As a result, the stability of measurement by the wavelength meter can be improved.

Second Embodiment

In the configuration illustrated in FIG. 9, there is the possibility that the reference optical source unit 2 has larger parts count. This may cause cost increase.

In addition, when there are adjustment differences in the measurement system and/or the control system, the oscillation wavelength of the He—Ne laser 2a may shift or He—Ne gas may be prone to come out from the laser to shorten the lifetime of the laser. These phenomena cause a decrease in reliability.

Thus, the embodiment of the present disclosure is an optical wavelength meter that simplifies the configuration of a reference optical source unit while maintaining stability of wavelength measurement. Specifically, the embodiment of the present disclosure is a low-cost and high-reliability optical wavelength meter.

FIG. 1 is a block diagram illustrating an optical wavelength meter according to the embodiment (the subject optical wavelength meter). In the embodiment, members identical to those in the first embodiment are given the same reference numerals as those in the first embodiment and descriptions thereof are omitted. The difference between the subject optical wavelength meter illustrated in FIG. 1 and the optical wavelength meter illustrated in FIG. 9 resides in the reference optical source unit.

The reference optical source unit 5 illustrated in FIG. 1 includes an unstabilized multi-longitudinal mode He—Ne laser 5a. The term "unstabilized" in the unstabilized multi-longitudinal mode He—Ne laser 5a means that "the laser resonator length is not controlled" unlike in the reference optical source unit 2 illustrated in FIG. 9. In addition, the term "multi-longitudinal mode" means the phrase "there is a plurality of multi-frequency components different each other in oscillation frequency."

Figure 2B:
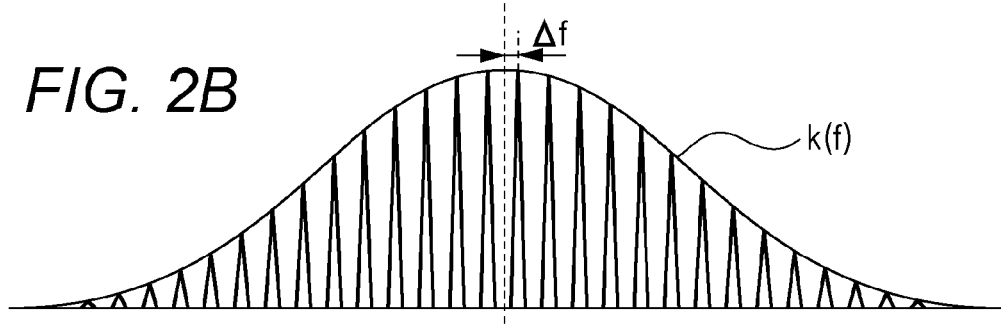
Figure 2C:
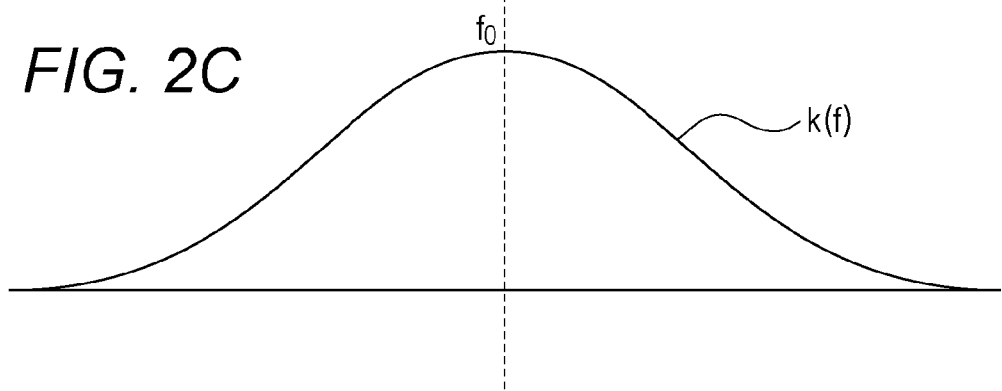

FIGS. 2A to 2C are explanatory diagrams illustrating magnitudes of electrical fields of the multi-longitudinal mode He—Ne laser. FIG. 2A illustrates the initial state. FIG. 2B illustrates the state in which the oscillator frequency shifts by $\Delta f$ from the state illustrated in FIG. 2A. Curved line k(f) is a gain curve of the He—Ne laser. The curve k(f) is characterized in being symmetric with respect to central frequency $f_0$.

In both the cases of FIGS. 2A and 2B, the magnitudes of electrical fields in the oscillation modes are determined with reference to the curve k(f). Therefore, if the frequency shifts by $\Delta f$ from the state of FIG. 2A to the state of FIG. 2B, the electrical field in the mode with increasing proximity to $f_0$ becomes larger, and the electrical field in the mode with decreasing proximity to $f_0$ becomes smaller.

Therefore, if there is a large number of oscillation modes, it is regarded that the electric field distribution of the laser has characteristics equivalent to the gain curve k(f) with the central frequency $f_0$ as illustrated in FIG. 2C. As a result, the wavelength $\lambda_0$ of the reference optical source unit becomes $\lambda_0 = c/f_0$, where c denotes speed of light.

The central frequency $f_0$ is determined by the difference between upper-level energy and lower-level energy of Ne for use in oscillation of the He—Ne laser. The central frequency $f_0$ takes a stable value and thus the wavelength $\lambda_0$ also takes a stable value.

When the movable mirrors 1j and 1k in the interferometer 1 illustrated in FIG. 10 change in position, the difference in optical path length between the optical path for a light beam reflected by the movable mirror 1j and the optical path for a light beam reflected by the movable mirror 1k changes from 0 to $\Delta d$. During the change, the positions of the interference fringes in the observed reference beam are stabilized.

Therefore, the number Nr of interference fringes in the reference beam becomes approximately constant, regardless of oscillation frequency variation $\Delta f$ in the individual longitudinal modes. Therefore, the equation (3) can be used to determine almost exactly the wavelength $\lambda_r$ of the input beam wavelength $\lambda_L$. Therefore, uncertainty in measurement can be reduced by the optical wavelength meter, as in the case of using a wavelength (frequency)-stabilized He—Ne laser light oscillating in the single longitudinal mode.

Operations of the subject optical wavelength meter with the multi-longitudinal mode He—Ne laser 5a as reference optical source unit 5 will be described below in detail. In the following description, the multi-longitudinal mode He—Ne laser 5a is a linear polarization output He—Ne laser that oscillates in three longitudinal modes.

As described above, the oscillation frequency of the laser is determined by the discrete resonator mode depending on the resonator length. If the oscillation frequency spacing (free spectrum range) in the resonator mode is designated as FSR, the resonator length as L, and the speed of light as c, the following relationship holds:

$$FSR = c/(2L) \tag{5}$$

The gain curve of the He—Ne laser is widened by Doppler effect due to motion of Ne molecules. The curve is a Gaussian curve with FWHM. If the shift of frequency in the gain curve from the central frequency $f_0$ is designated as $\delta f$, the electric field amplitude in the oscillation mode is expressed as:

$$k(\delta f) = \mathrm{EXP}[-\ln(2)(\delta f/\mathrm{FWHM})^2] \tag{6}$$

The gain central frequency $f_0$ has a stable quantity determined by a difference in Ne energy level at oscillation of the laser.

It is known that adjacent longitudinal modes of a He—Ne laser are in a linear polarization state in which the modes are almost orthogonal to each other in azimuth. A linear polarization output laser includes a Brewster window in a resonator. This type of laser is configured to oscillate in one of the adjacent modes. Accordingly, when the linear polarization output laser oscillates simultaneously in three oscillation modes with $N^{th}$ mode in the middle, the oscillation modes are three alternate longitudinal modes, that is, $N-2^{th}$, $N^{th}$, and $N+2^{th}$ modes.

If the $N^{th}$ mode shifts $\Delta f$ from the center of a gain curve, the frequency of the $N-2^{th}$ mode is $f_0 + \Delta f - 2FSR$. The frequency of the $N+2^{th}$ mode is $f_0 + \Delta f + 2FSR$. Therefore, the electric field amplitude $K(m)$ in the three longitudinal modes is expressed by equations (5) and (6) as:

$$K(m) = \exp[-\ln(2)((\Delta f - (N-m)FSR)/FWHM)^2] \tag{7}$$

where m denotes the number of resonator modes, and m the number of resonators, and $m = N-2$, $N$, or $N+2$.

The reference optical source unit 5 in the subject optical wavelength meter has as a light source a He—Ne laser oscillating simultaneously in the three longitudinal modes.

Figure 3A:
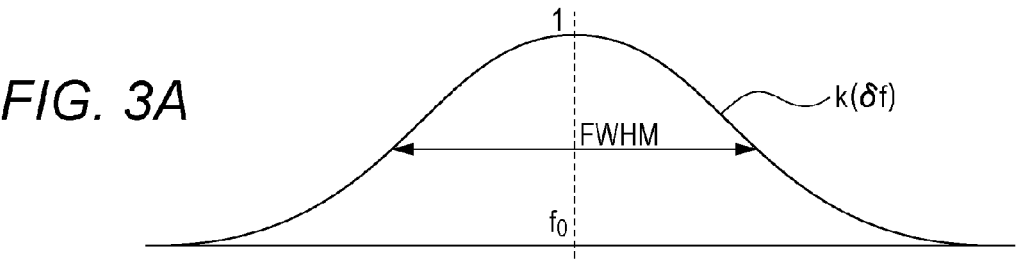
FIGS. 3A to 3E are explanatory diagrams illustrating relationships between frequencies and magnitudes of the electric fields of the laser oscillating in three different longitudinal modes.
Figure 3B:
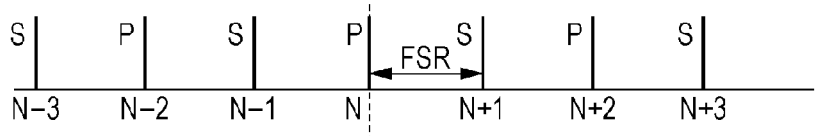

FIGS. 3A to 3E are explanatory diagrams of relationships between frequencies and magnitudes of electric fields of a laser oscillating in the three longitudinal modes. FIG. 3A illustrates a gain curve K(Δf). The gain curve K is almost symmetric with respect to the gain central frequency $f_0$. FIG. 3B illustrates the relationship between frequencies in the resonator mode and the gain curve (FIG. 3A) when the frequency in the $N^{th}$ mode is almost the same as the gain central frequency $f_0$.

Figure 3C:
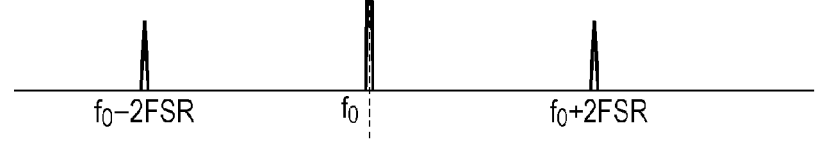

FIG. 3C illustrates the relationships between the three modes and the magnitudes of electric fields of the linear polarization output laser when the resonator mode is in the state as illustrated in FIG. 3B (that is, when Δf=0 in the equation (7)). It is understood from FIG. 3C that, when the frequency in the Nth mode is almost the same as the gain central frequency $f_0$, the magnitude of the electric field in the $N-2^{th}$ mode almost coincides with the magnitude of the electric field in the $N+2^{th}$ mode.

Figure 3D:
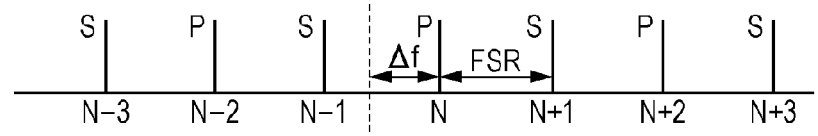
Figure 3E:
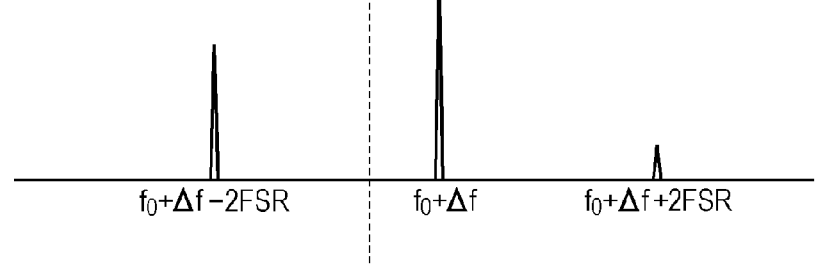

FIG. 3D illustrates the resonator mode in which the $N^{th}$ mode shifts by Δf from the gain central frequency $f_0$. In this case, the magnitudes of electric fields in the three modes are as illustrated in FIG. 3E. As being obvious from comparison between FIGS. 3C and 3E, the electric field in the $N-2^{th}$ mode closer to the gain central frequency $f_0$ becomes larger, and in reverse, the electric field in the $N-2^{th}$ mode distant from the gain central frequency $f_0$ becomes smaller.

The thus characteristic unstabilized multi-longitudinal mode He—Ne laser 5a can also be used as a reference optical source unit in the foregoing configuration illustrated in FIG. 9. In this case, as described above, the electric field becomes larger in the mode closer to the gain central frequency $f_0$, which exerts a larger influence on the interference fringe waveform. On the other hand, the electric field becomes smaller in the mode distant from the gain central frequency $f_0$, which exerts a smaller influence on the interference fringe waveform. Therefore, the positions of interference fringes resulting from combination of the three longitudinal modes are more stable as compared to the positions of interference fringes with a change in the frequency of a laser oscillating in the single-longitudinal mode.

As described above, two light beams split by the beam splitter 1g in the interferometer 1 illustrated in FIG. 10 are reflected by the movable mirrors 1j and 1k. The reflected light beams are superimposed again by the beam splitter 1g.

Electric field D of two optical paths in $m^{th}$ oscillation mode can be represented by the following expressions (8) and (9) using the phase of the electric field in one optical path as a reference:

$$D(t,m,0)=\exp\{(i\cdot 2\pi[f_0+\Delta f-(N-m)FSR]t)\} \qquad (8)$$

$$D(t,m,\Delta d)=\exp[i\cdot 2\pi[f_0+\Delta f-(N-m)FSR](t-\Delta d/c)] \qquad (9)$$

In the expressions, Δd represents an optical path length difference between the two optical paths, t represents a time, $f_0+\Delta f-(N-m)FSR$ represents the frequency in the oscillation mode, and c represents the speed of light.

In the case of using a laser with three modes as in the embodiment, entered into the reference beam receiver 1n is a beam superimposed after the three modes are separated into two optical paths (the total sum of six components). In addition, the electric field amplitudes in the three oscillation modes are expressed by the equation (7). Thus, electric field E(t) on the optical receiver is expressed as:

$$E(t)=\Sigma K(m)[D(t,m,0)+D(t,m,\Delta d)](m=N-2,N, \text{ or } N+2) \qquad (10)$$

Interference fringe signal intensity I is a product of E(t) and its complex conjugate E*(t) and thus is expressed as:

$$I = E(t)E^*(t) \qquad (11)$$
$$= \Sigma[K(m)]^2[D(t, m, 0) \cdot D^*(t, m, 0) +$$
$$D(t, m, \Delta d) \cdot D^*(t, m, \Delta d)] +$$
$$\Sigma[K(m)]^2[D(t, m, 0) \cdot D^*(t, m, \Delta d) +$$
$$D(t, m, \Delta d) \cdot D^*(t, m, 0)] + \ldots$$
$$= 2\Sigma[K(m)]^2 + 2\Sigma[K(m)]^2 \cos 2\pi[f_0 + \Delta f - (N-m)FSR](\Delta d/c) + \ldots$$

In the foregoing equation, the first term is a constant term.

The second term is the function of the optical path length difference Δd and the sum of interference fringes in the individual longitudinal modes.

In the third term, " . . . " denotes a collection of terms changing over time with the frequency of 2 FSR or 4 FSR.

For example, if the resonator length of the He—Ne laser is 0.3 to 0.5 m, FSR is determined as 300 to 500 MHz from the equation (5). The interference signal converted into an electrical signal by the reference beam receiver 1n illustrated in FIG. 10 passes through a low-pass filter with a cut-off frequency of about 10 MHz within the signal processor 3 illustrated in FIG. 1. Accordingly, the third term indicated by " . . . " with the frequency component of 2 FSR or 4 FSR in the equation (11) is ignorable.

Therefore, the interference fringe signal intensity I for use in calculating the number of interference fringes is expressed using the equations (7) and (11) as follows:

$$I = \Sigma 2\exp[-2\ln(2)((\Delta f - (N-m)FSR)/FWHM)^2] \times \qquad (12)$$
$$(1 + \cos 2\pi[f_0 + \Delta f - (N-m)FSR](\Delta d/c))$$

$$m = N-2, N, \text{ or } N+2 \qquad (13)$$

Figure 4A:
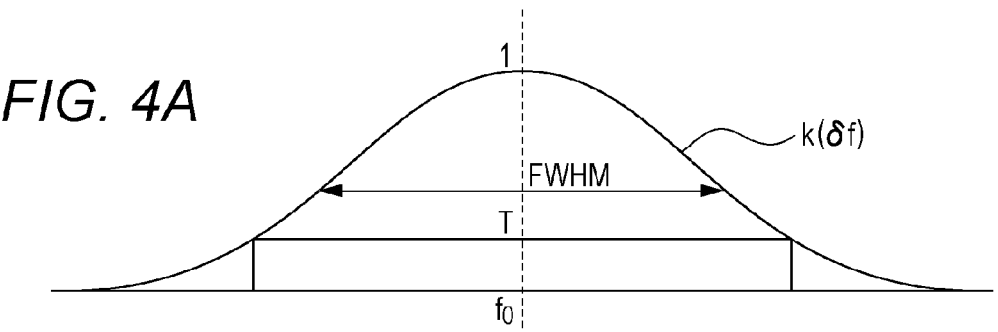
FIGS. 4A to 4C are other explanatory diagrams illustrating magnitudes of electric fields of the multi-longitudinal mode He—Ne laser.
Figure 4B:
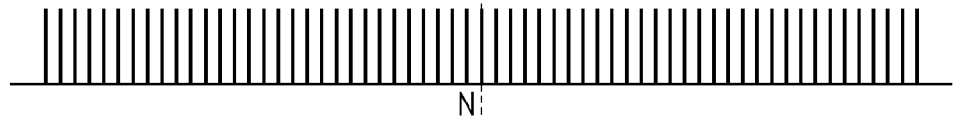
Figure 4C:
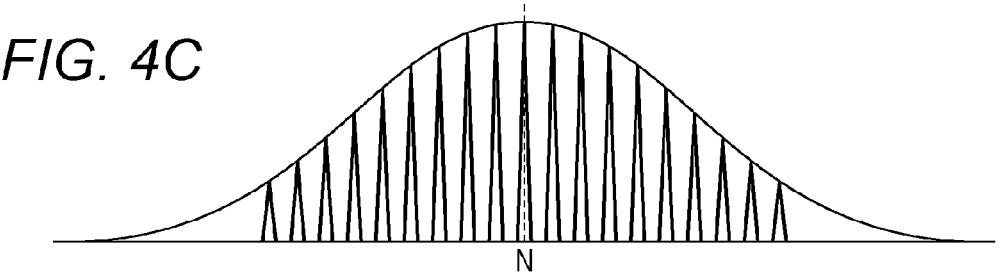

In actuality, if the electric filed amplitude K(m) in $m^{th}$ oscillation longitudinal mode is equal to or more than oscillation threshold value Th, the laser oscillates in the resonator mode illustrated in FIG. 4B within the range of frequency satisfying the gain curve k(δf)≥Th as illustrated in FIG. 4A. Therefore, for example, the number of oscillation modes is not limited to three but there may be a large number of oscillation modes as illustrated in FIG. 4C. In this case, instead of the condition for m in the equation (12), the following condition can be applied:

$$K(m) \geq Th, m = \ldots, N-2, N, N+2, \ldots \qquad (14)$$

It is well known that the number of modes increases as the resonator mode spacing FSR becomes smaller with respect to the gain curve. Descriptions will be given as to a calculation example of the amount of position shifts of interference fringes in the case where there is a change in the shift Δf from the gain central frequency in the $N^{th}$ mode of the interferometer 1 with variations in the optical path length Δd=0 to 16 mm, using the equations (12) and (14).

Figure 5:
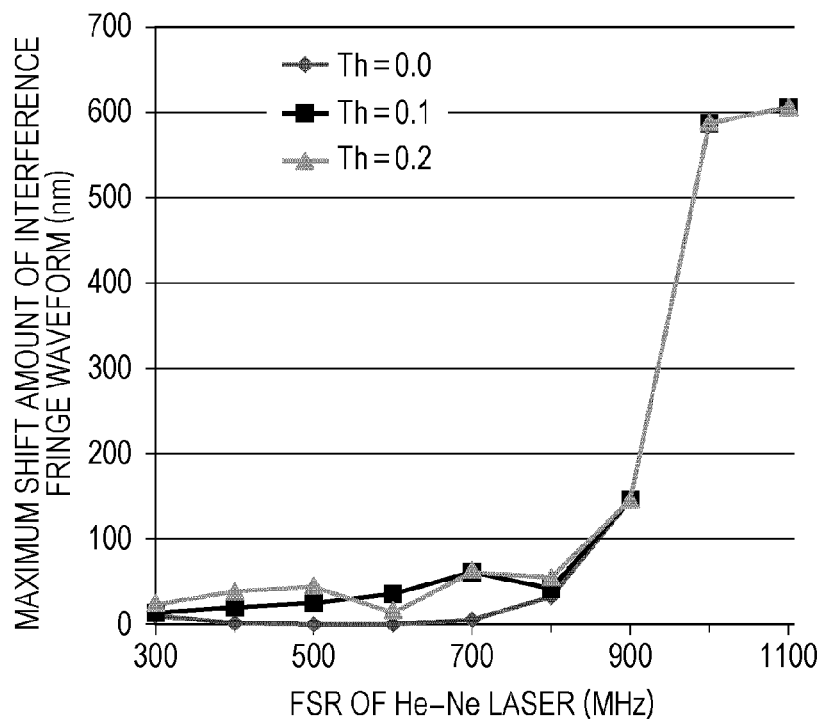
FIG. 5 is a graphical representation of exemplary calculated maximum shift amounts of interference fringe waveforms.

FIG. 5 illustrates an example of calculation result of maximum change amount ΔX of interference fringe positions with optical path length difference Δd=16 mm or the like in the case where the frequency of the He—Ne laser changes by Δf=−FSR∼+FSR, according to the equation (12). It is understood that the positions of the interference fringes are more stable as the FSR of the He—Ne laser becomes smaller and the number of modes for simultaneous oscillation increases.

Derived from the equation (3) is a relational equation between the stability of positions of interference fringes and the stability of wavelength measurement values. That is, the shift $\Delta\lambda_U$ of wavelength measurement result of the input beam is expressed as follows when the number Nr of interference fringes in the reference beam in the equation (3) changes by $\Delta Nr$:

$$\Delta\lambda u = (\Delta Nr/Nu) \cdot (nu/nr) \cdot \lambda r \quad (15)$$

In addition, the following equation holds:

$$\Delta Nr = \Delta X/\lambda r \quad (16)$$

Thus, when the both sides of the equation (15) are divided by the both sides of the equation (3) and the equation (16) is substituted to the division result to eliminate $\Delta Nr$, the following equation holds:

$$\Delta\lambda u = (\Delta X/Nr) \cdot (\lambda u/\lambda r) \quad (17)$$

Figure 6:
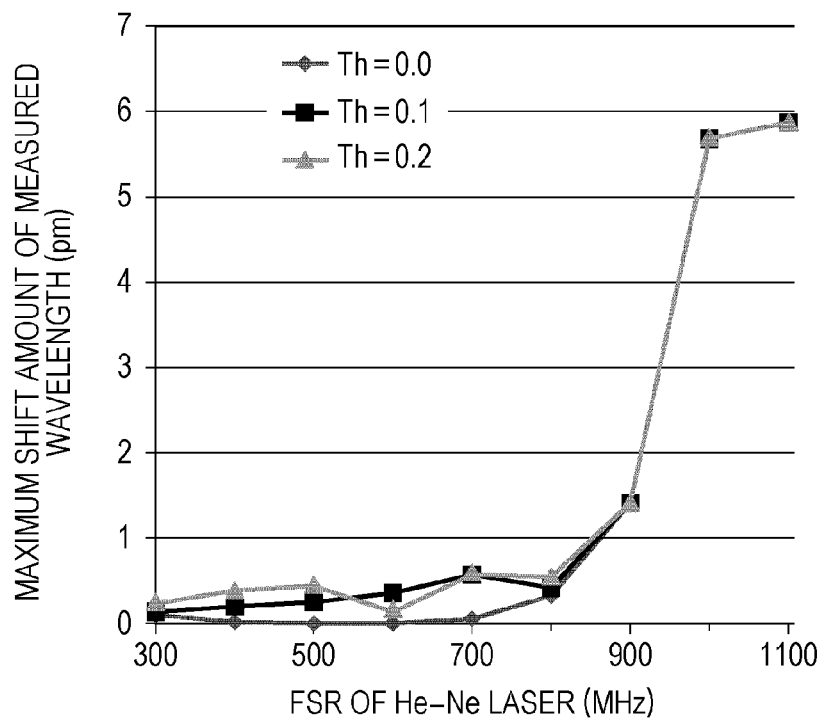
FIG. 6 is a graphical representation of exemplary calculated values of maximum shift amounts in measured wavelengths.

The maximum shift amount $\Delta\lambda_U$ of measured wavelength is calculated by substituting the resulting maximum change amount $\Delta X$ of interference fringe positions illustrated in FIG. 5 to the equation (17) where $\lambda u=1550$ nm, $\lambda r=633$ nm, and $Nr=260000$. The results are plotted in FIG. 6. FIG. 6 reveals that the stability of the measured wavelength increases as the FSR becomes narrower and the number of modes for simultaneous oscillation increases. It is obvious that the measured wavelength becomes stable by using a He—Ne laser having a small oscillation threshold value T.

Figure 7:
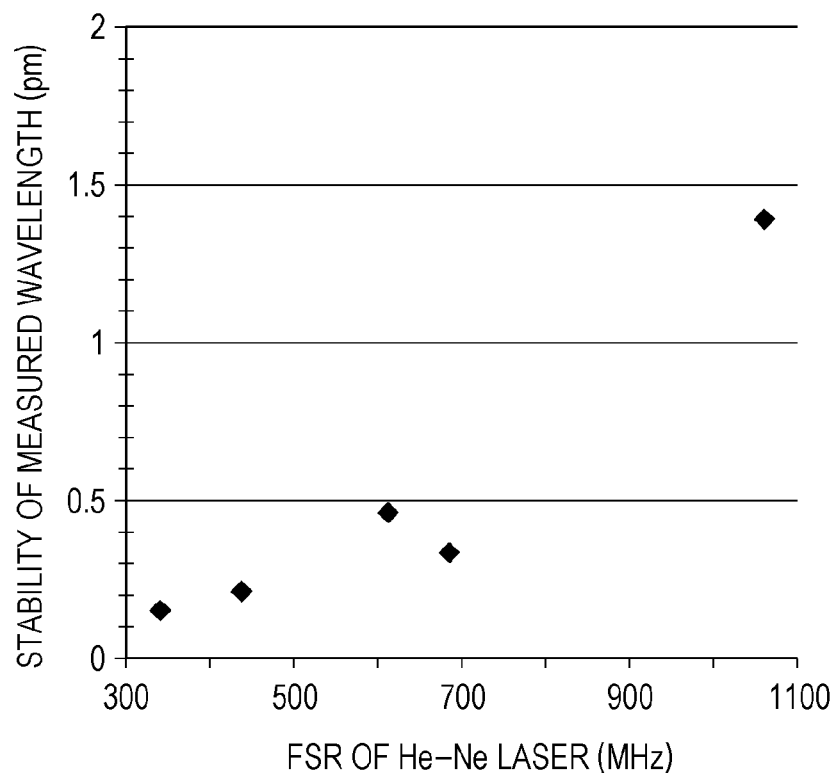
FIG. 7 is a graphical representation of an exemplary actual stability measurements of measured wavelength.

FIG. 7 illustrates the exemplary results of measurement of wavelength stability (maximum value−minimum value) of a frequency-stabilized optical source commercially available as input beam. The results were obtained using several kinds of He—Ne lasers with different FSRs as a reference optical source unit. The wavelength of the light source is 1550.515 nm, and uncertainty in the light source is $\sigma<10^{-9}$. In the measurement, an interferometer with an optical path length difference changing up to 16 mm was used.

As in the case of FIG. 6 where determination is made from the calculation results, it is understood from FIG. 7 that the stability is improved with smaller FSRs and an increased number of modes. In this arrangement, uncertainty $\sigma$ can be calculated by $\sigma=\Delta\lambda/2\sqrt{3}$. Therefore, the uncertainty $\sigma$ becomes about 0.05 pm by using a multi-mode laser with FSR<500 MHz or the like.

Figure 8:
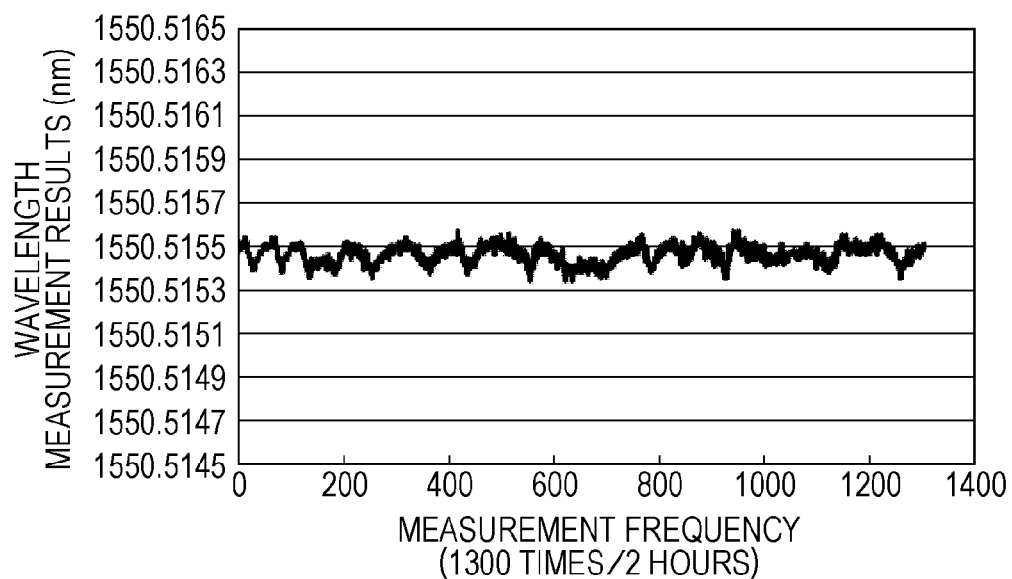
FIG. 8 is a graphical representation of exemplary results of wavelength measurements.

FIG. 8 illustrates results of wavelength measurement using a He—Ne laser with FSR=438 MHz. The wavelength stability of this laser is as illustrated in FIG. 7. In many case, uncertainty in a wavelength meter using a wavelength-stabilized He—Ne laser in a single longitudinal mode is $3\sigma\leq0.3$ pm at a measured wavelength of 1550 nm Equivalent uncertainty can be obtained by the subject optical wavelength meter in which an unstabilized He—Ne laser oscillating in multiple modes is used as a reference optical source unit.

As described in the foregoing, the subject optical wavelength meter uses a less expensive unstabilized multi-mode He—Ne laser as a reference optical source unit, instead of an expensive frequency-stabilized He—Ne laser. In this case, the optical wavelength meter can be also provided with high-accuracy equivalent to one using a frequency-stabilized He—Ne laser.

In the embodiment, the signal processor 3 compares the number of interference fringes in the reference beam and the number of interference fringes in the input beam (that is, the signal processor 3 counts the numbers of interference fringes in the reference beam and the input beam) to calculate the wavelength of the input beam. However, the embodiment is not limited to this but the signal processor 3 may calculate the wavelength of the input beam using Fourier transform. In this case, the signal processor 3 uses the interference fringe waveform of the reference beam to sample the interference fringe waveform of the input beam. After that, the signal processor 3 calculates the frequency and wavelength of the measured signal by Fourier transform. Thus, measurement uncertainty can be reduced by applying the subject optical wavelength meter by which the positions of interference fringes in the input beam are stable.

The subject optical wavelength meter can also be applied to spectrum analyzers using Fourier transform.

In the embodiment described above, a He—Ne laser at a wavelength of 633 nm is used. Alternatively, the oscillation wavelength of the laser may be another oscillation wavelength of 543 nm, for example.

As a laser of the subject optical wavelength meter, another kind of gas laser may be used, such as an Ar laser, for example, having a central frequency in a stable gain curve.

In the subject optical wavelength meter, there is no limitation on configuration of an interferometer, or kind of an optical element or a light-receiving element used in the interferometer 1.

The disclosure herein can also be applied to various measurement instruments using interferometers other than a wavelength meter.

In the foregoing, wavelength uncertainty at 1550 nm in a communication wavelength band is described. However, the wavelength uncertainty can also be applied to other wavelength bands.

As described in the foregoing, the present embodiment can provide a low-cost, high-reliability optical wavelength meter that simplifies the configuration of the reference optical source unit while maintaining the wavelength measurement stability. One embodiment of the present disclosure relates to an optical wavelength meter, specifically, stabilization of the reference optical source unit for use in the light wavelength and simplification of an entire configuration of the device. The optical wavelength meter of the present disclosure may be any one of first to fifth optical wavelength meters described below.

The first optical wavelength meter includes an interferometer, a reference optical source unit, a signal processor, and an indicator. The optical wavelength meter is configured such that the signal processor calculates the wavelength of input beam with reference to interference fringe information of reference beam and interference fringe information of the input beam obtained from the interferometer, and a laser oscillating in a multi-longitudinal mode is provided as a reference optical source of the reference optical source unit.

The second optical wavelength meter is configured such that the interferometer in the first optical wavelength meter is a Michelson interferometer.

The third optical wavelength meter is configured such that the signal processor in the first or second optical wavelength meter calculates the wavelength of the input beam by counting the number of interference fringes with reference to the interference fringe information of the reference beam and the interference fringe information of the input beam obtained from the interferometer.

The fourth optical wavelength meter is configured such that the signal processor in the first or second optical wavelength meter calculates the wavelength of the input beam by Fourier transform with reference to the interference fringe information of the reference beam and the interference fringe information of the input beam obtained from the interferometer.

The fifth optical wavelength meter is configured such that a resonator mode spacing (free spectrum range) of the laser in any of the first to fourth optical wavelength meters is 500 MHz or less.

The foregoing detailed description has been presented for the purposes of illustration and description. Many modifications and variations are possible in light of the above teaching. It is not intended to be exhaustive or to limit the subject matter described herein to the precise form disclosed. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims appended hereto.

What is claimed is:

1. An optical wavelength meter, comprising:
    an interferometer;
    a laser configured to oscillate in a multi-longitudinal mode; and
    a signal processor configured to calculate a wavelength of an input beam with reference to interference fringe information of a multi-longitudinal mode reference beam generated by the laser and interference fringe information of the input beam obtained from the interferometer.

2. The optical wavelength meter according to claim 1, wherein the interferometer includes a Michelson interferometer.

3. The optical wavelength meter according to claim 1, wherein the signal processor is configured to calculate the wavelength of the input beam by counting the number of interference fringes with reference to the interference fringe information of the multi-longitudinal mode reference beam and the interference fringe information of the input beam obtained from the interferometer.

4. The optical wavelength meter according to claim 1, wherein the signal processor is configured to calculate the wavelength of the input beam by Fourier transform with reference to the interference fringe information of the multi-longitudinal mode reference beam and the interference fringe information of the input beam obtained from the interferometer.

5. The optical wavelength meter according to claim 1, wherein a resonator mode spacing of the laser is 500 MHz or less.

6. The optical wavelength meter according to claim 1, wherein the laser includes a multi-longitudinal mode He—Ne laser.

7. The optical wavelength meter according to claim 6, wherein the He—Ne laser includes an unstabilized multi-longitudinal mode He—Ne laser.

8. The optical wavelength meter according to claim 1, wherein the number of longitudinal modes in the multi-longitudinal mode reference beam is three or more.

* * * * *